US008982713B2

(12) United States Patent
Balasubramanian et al.

(10) Patent No.: US 8,982,713 B2
(45) Date of Patent: Mar. 17, 2015

(54) QUALITY OF SERVICE CONFIGURATION FOR WIRELESS COMMUNICATION

(75) Inventors: Srinivasan Balasubramanian, San Diego, CA (US); Reza Shahidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1026 days.

(21) Appl. No.: 11/687,569

(22) Filed: Mar. 16, 2007

(65) Prior Publication Data

US 2007/0286117 A1 Dec. 13, 2007

Related U.S. Application Data

(60) Provisional application No. 60/785,686, filed on Mar. 24, 2006.

(51) Int. Cl.
*H04W 28/24* (2009.01)
*H04W 76/04* (2009.01)

(52) U.S. Cl.
CPC .............. *H04W 28/24* (2013.01); *H04W 76/04* (2013.01)
USPC .......................................................... 370/252

(58) Field of Classification Search
CPC ..... H04W 28/16; H04W 28/18; H04W 28/20; H04W 28/24; H04W 28/26
USPC .......................................................... 370/252
See application file for complete search history.

(56) References Cited

U.S. PATENT DOCUMENTS

| | | | | |
|---|---|---|---|---|
| 2002/0196798 | A1* | 12/2002 | Isokangas et al. | 370/411 |
| 2003/0060210 | A1* | 3/2003 | Ravishankar et al. | 455/452 |
| 2004/0037264 | A1 | 2/2004 | Khawand | |
| 2004/0184446 | A1* | 9/2004 | Havens | 370/352 |
| 2005/0128963 | A1* | 6/2005 | Gazda et al. | 370/278 |
| 2006/0067324 | A1* | 3/2006 | Kim et al. | 370/395.2 |

FOREIGN PATENT DOCUMENTS

| | | |
|---|---|---|
| CN | 1679265 | 10/2005 |
| EP | 1045600 A1 | 10/2000 |

(Continued)

OTHER PUBLICATIONS

SIP: Session Initiation Protocol. Network Working Group Request for Comments: 3261. Jun. 2002.*
Hogg, Chris. SIP Local vs Remote Ringback on 180. Jun. 28, 2002.*
The Authoritative Dictionary of IEEE Standards Terms. Seventh Edition. IEEE Press. Published Dec. 2000.*

(Continued)

*Primary Examiner* — Jason Mattis
*Assistant Examiner* — Stephen J Clawson
(74) *Attorney, Agent, or Firm* — Kevin T. Cheatham

(57) ABSTRACT

Techniques to configure quality of service (QoS) for communication are described. An access terminal configures a first QoS profile prior to a call. This QoS profile is for a set of QoS parameters that provides certain QoS. The access terminal thereafter establishes (e.g., originates or terminates) a call with an access network. If the first QoS profile is appropriate for the call, then QoS is not reconfigured. However, the access terminal may determine that a second QoS profile is to be used for the call, e.g., based on a format or a rate set supported by a remote/other terminal for the call. The access terminal would then configure the second QoS profile during the call. The access terminal may exchange data in accordance with (a) the first QoS profile before the second QoS profile is configured and activated and (b) the second QoS profile after it is configured and activated.

12 Claims, 11 Drawing Sheets

(56) References Cited

FOREIGN PATENT DOCUMENTS

| | | | |
|---|---|---|---|
| EP | 1303156 | A1 | 4/2003 |
| FR | 2852178 | | 9/2004 |
| KR | 200559629 | | 6/2005 |

OTHER PUBLICATIONS

International Search Report and Written Opinion—PCT/US2007/064966, International Search Authority—European Patent Office—Aug. 3, 2007.

* cited by examiner

QUALITY OF SERVICE CONFIGURATION FOR WIRELESS COMMUNICATION

CLAIM OF PRIORITY UNDER 35 U.S.C. §119

The present Application for Patent claims priority to Provisional Application No. 60/785,686 entitled "Efficient switching between RS1 and RS2" filed Mar. 24, 2006, and assigned to the assignee hereof and hereby expressly incorporated by reference herein.

BACKGROUND

I. Field

The present disclosure relates generally to communication, and more specifically to techniques for configuring quality of service (QoS) for wireless communication.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, etc.

A user may utilize an access terminal (e.g., a cellular phone) to obtain a desired service (e.g., voice) from a wireless network. The desired service may be satisfactorily provided to the user by ensuring that the required QoS is achieved for the service. The required QoS may be quantified by a set of QoS parameters, which may be dependent on the desired service. For example, voice service may require a relatively stringent delay, a certain minimum guaranteed data rate, and a certain target packet error rate for satisfactory performance.

The access terminal may exchange signaling with the wireless network in order to configure QoS for the desired service. The QoS signaling may be exchanged during call setup at the start of a call. If the required QoS changes for any reason during the call, then the QoS signaling may be exchanged again to reconfigure QoS. Each QoS signaling exchange may delay the call, consume valuable radio resources, and/or have other deleterious effects.

There is therefore a need in the art for techniques to efficiently configure QoS for wireless communication.

SUMMARY

Techniques to efficiently configure QoS for communication are described herein. In an aspect, an access terminal configures a first QoS profile prior to a call. This QoS profile is for a set of QoS parameters that provides certain QoS. The access terminal thereafter establishes a call, e.g., a Voice-over-Internet Protocol (VoIP) call, with an access network. If the first QoS profile is appropriate for the call, then QoS does not need to be reconfigured. However, the access terminal may determine that a second QoS profile is to be used for the call, e.g., based on a format or a rate set supported by a remote/other terminal for the call. The access terminal would then configure the second QoS profile during the call.

The access terminal may activate the first QoS profile at the start of the call, prior to determining that the second QoS profile is to be used for the call. The access terminal may exchange data with the access network in accordance with (a) the first QoS profile before the second QoS profile is configured and activated and (b) the second QoS profile after it is configured and activated.

The first QoS profile may be for a rate set that is more likely to be used for the call, a rate set that is used for a prior call, etc. The second QoS profile may be for a rate set that is selected for use for the current call. Each rate set may include at least one data rate usable for communication. The first QoS profile may support a first rate set having a first peak data rate, e.g., 9.6 kilobits/second (Kbps). The second QoS profile may support a second rate set having a second peak data rate, e.g., 14.4 Kbps. The access terminal may then exchange data based on at least one data rate that is lower than or equal to the first peak data rate before the second QoS profile is configured and activated.

Various aspects and features of the disclosure are described in further detail below.

DETAILED DESCRIPTION

The QoS configuration techniques described herein may be used for various wireless communication networks. The terms "network" and "system" are often used interchangeably. For example, the techniques may be used for CDMA, TDMA, FDMA, and OFDMA networks. A CDMA network may implement a radio technology such as cdma2000, Wideband-CDMA (W-CDMA), etc. cdma2000 covers IS-2000, IS-95, and IS-856 standards. A TDMA network may implement a radio technology such as Global System for Mobile Communications (GSM), Digital Advanced Mobile Phone System (D-AMPS), etc. These various radio technologies and standards are known in the art. W-CDMA and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available.

For clarity, certain aspects of the QoS configuration techniques are described for a High Rate Packet Data (HRPD) network that implements IS-856. An HRPD network is also referred to as a CDMA2000 1xEV-DO network, a 1xEV-DO network, a 1x-DO network, a High Data Rate (HDR) network, etc.

Figure 1:
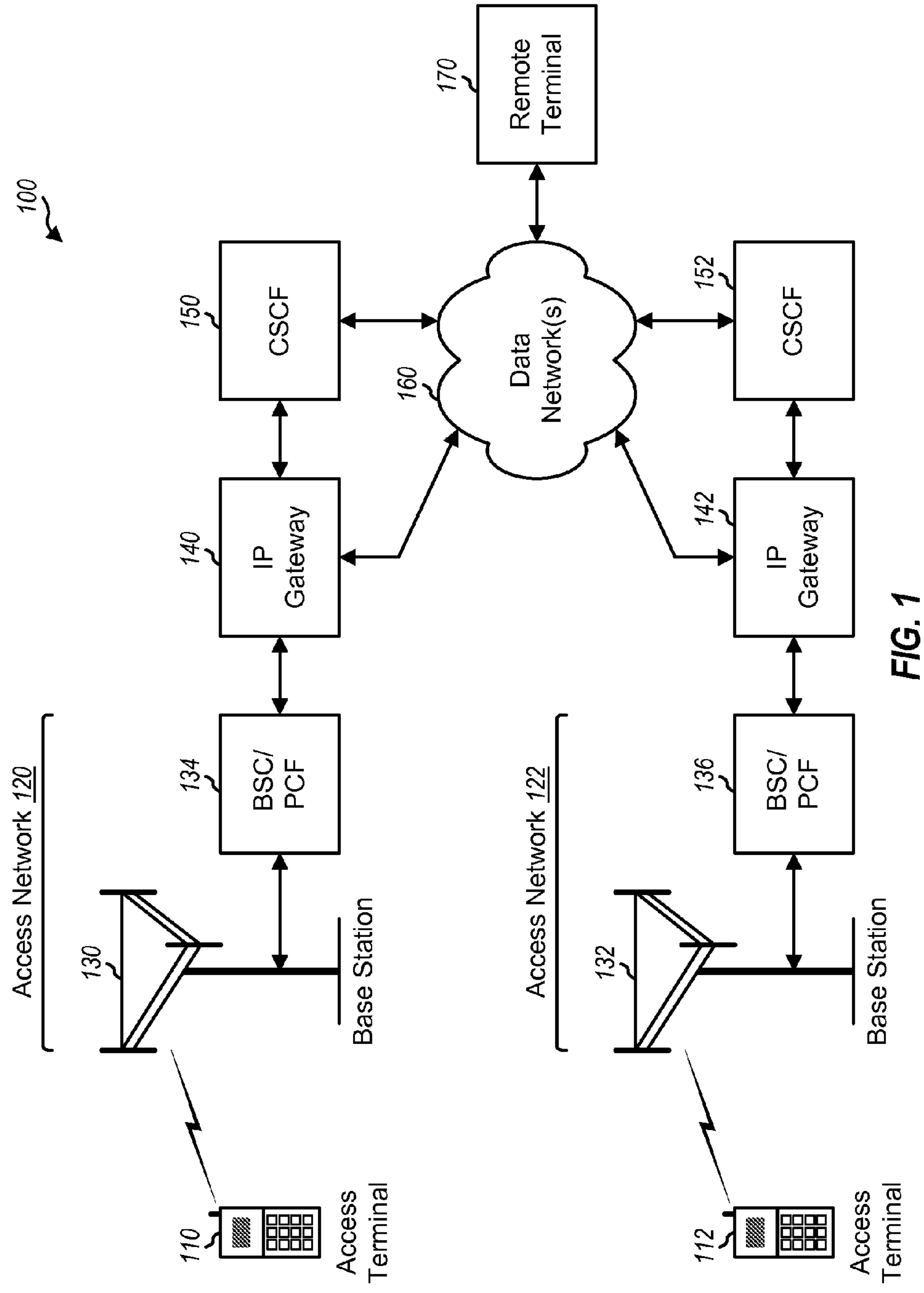
FIG. 1 shows a wireless communication network.

FIG. 1 shows a wireless communication network 100, which may be an HRPD network. Wireless network 100 includes (a) access networks 120 and 122 that support radio communication for access terminals and (b) network entities that perform various functions to support communication services. An access network may also be referred to as a radio network, a radio access network, etc. Access network 120 may include any number of base stations 130 and any number of Base Station Controllers/Packet Control Functions (BSCs/PCFs) 134. Similarly, access network 122 may include any number of base stations 132 and any number of BSCs/PCFs 136. A base station is generally a fixed station that communicates with the access terminals and may also be referred to as an access point, a Node B, an enhanced Node B, etc. Each BSC/PCF couples to one or more base stations, provides coordination and control for the base stations under its control, and further routes traffic data for these base stations.

Internet Protocol (IP) gateways 140 and 142 support data services for access terminals communicating with access networks 120 and 122, respectively. For example, IP gateways 140 and 142 may be responsible for the establishment, maintenance, and termination of data sessions for access terminals and may further assign dynamic IP addresses to the access terminals. IP gateways 140 and 142 may communicate with an Authentication, Authorization, and Accounting (AAA) server (not shown in FIG. 1) to verify and authenticate access terminals requesting data services. IP gateways 140 and 142 may couple to data network(s) 160, which may comprise a core network, private data networks, public data networks, the Internet, etc. IP gateways 140 and 142 can communicate with various entities (e.g., a remote terminal 170) via data network(s) 160. IP gateways 140 and 142 may also be referred to as Packet Data Serving Nodes (PDSNs), etc.

Call Session Control Functions (CSCFs) 150 and 152 perform various functions to support IP Multimedia Subsystem (IMS) services such as VoIP, multimedia, etc. Each CSCF may include a Proxy CSCF (P-CSCF), an Interrogating CSCF (I-CSCF), a Serving CSCF (S-CSCF), etc. The P-CSCF may accept requests from access terminals and either service these requests internally or forward the requests to other entities. The I-CSCF may perform various functions such as assigning an S-CSCF to an access terminal for registration, routing requests from another network to the S-CSCF, and generating Call Detail Records (CDRs) for charging and resource allocation. The S-CSCF performs session control services for the access terminals and maintains session state used to support various services.

Access terminals 110 and 112 may communicate with access networks 120 and 122, respectively, to obtain various communication services supported by wireless network 100. An access terminal may also be referred to as a mobile station (MS), a user equipment (UE), a user terminal, a subscriber unit, a station, etc. An access terminal may be a cellular phone, a personal digital assistant (PDA), a wireless modem, a handheld device, a laptop computer, etc.

Figure 2:
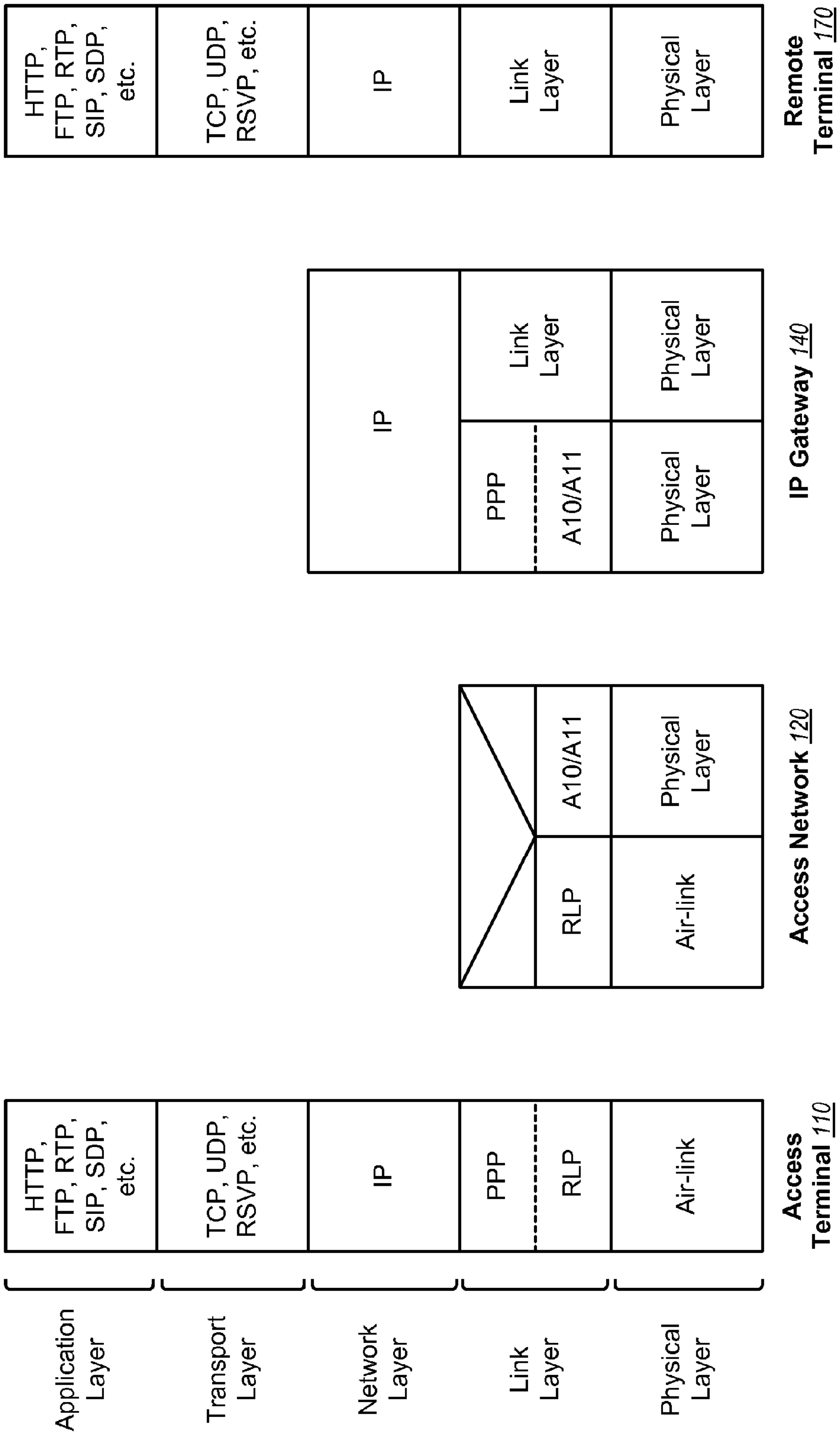
FIG. 2 shows example protocol stacks at various entities in FIG. 1.

FIG. 2 shows example protocol stacks at various entities in FIG. 1 for communication between access terminal 110 and remote terminal 170. The protocol stack for each entity may include an application layer, a transport layer, a network layer, a link layer, and a physical layer.

Access terminal 110 may communicate with remote terminal 170 (or access terminal 112) using HyperText Transfer Protocol (HTTP), File Transfer Protocol (FTP), Real-time Transport Protocol (RTP), Session Initiation Protocol (SIP), Session Description Protocol (SDP), and/or other protocols at the application layer. SIP is a signaling protocol for creating, modifying, and terminating sessions for VoIP, multimedia, etc. SDP is a signaling protocol for describing multimedia sessions. Application layer data may be sent using Transmission Control Protocol (TCP), User Datagram Protocol (UDP), and/or other protocols at the transport layer. Resource Reservation Protocol (RSVP) may be used to reserve resources across a network at the transport layer. Transport layer data (e.g., for TCP and/or UDP) may be encapsulated in IP packets, which are exchanged between access terminal 110 and remote terminal 170 via access network 120, IP gateway 140, and possibly other entities.

The link layer between access terminal 110 and access network 120 is typically dependent on the radio technology used by the access network. For cdma2000, the link layer is implemented with Point-to-Point Protocol (PPP) over Radio Link Protocol (RLP). Access terminal 110 maintains a PPP session with IP gateway 140 for a data session and communicates with access network 120 via RLP for data exchanges. RLP operates on top of an air-link interface, e.g., IS-856 for HRPD. Access network 120 communicates with IP gateway 140 via a technology-dependent interface (e.g., A10 and A11 interfaces) that operates on top of a physical layer. A10 is a data interface and A11 is a signaling interface between PCF 134 and IP gateway 140. IP gateway 140 may communicate with remote terminal 170 via IP over a link layer and a physical layer.

Figure 3:
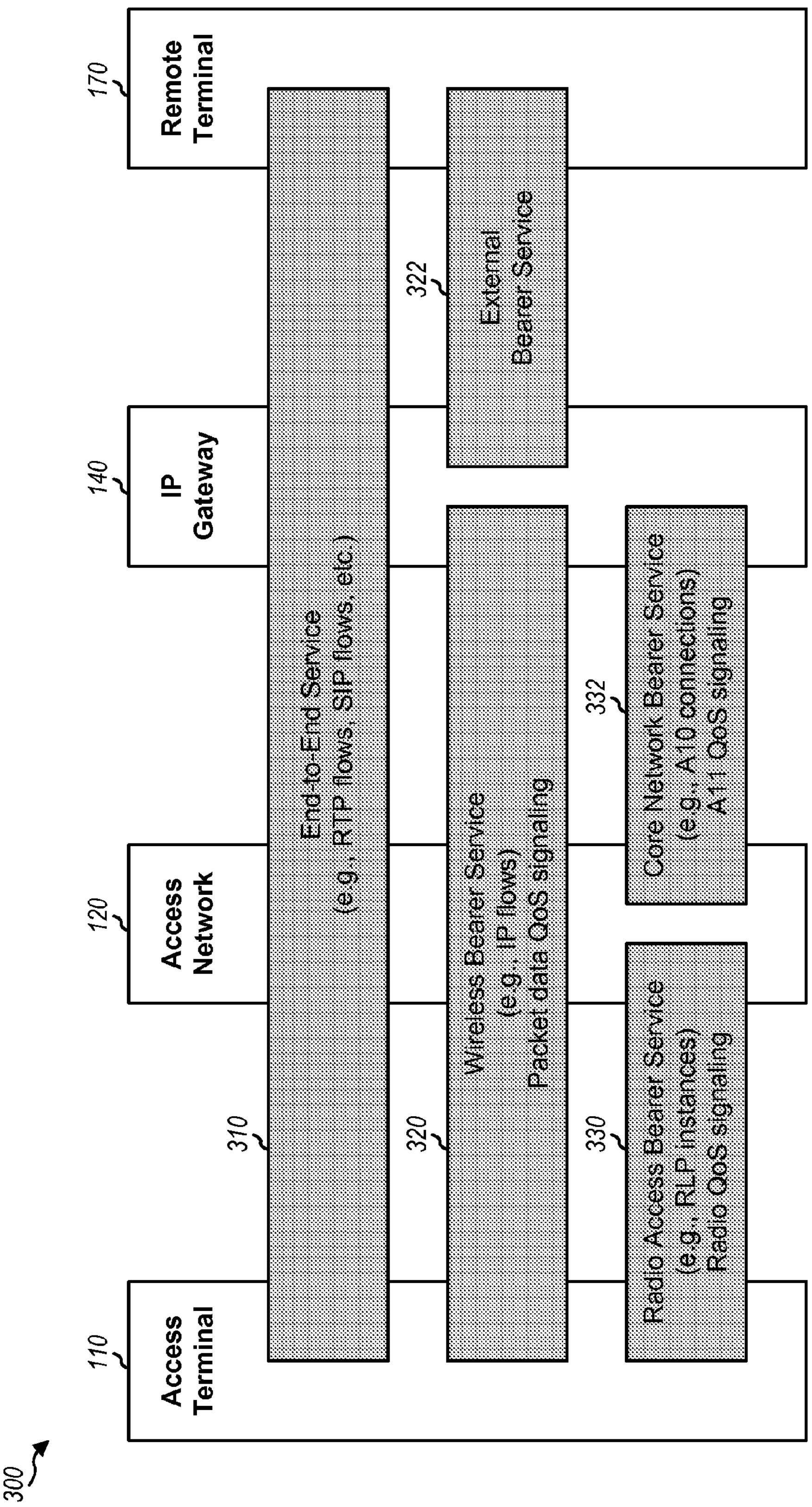
FIG. 3 shows a QoS architecture.

FIG. 3 shows a QoS architecture 300 that may be used for communication between access terminal 110 and remote terminal 170. Access terminal 110 may exchange traffic data with remote terminal 170 at an application level via an end-to-end service 310. End-to-end service 310 is realized by (1) a wireless bearer service 320 that is provided by wireless network 100 and (2) an external bearer service 322 that may be provided by data network(s) 160. Wireless bearer service 320 is dependent on the network technology, e.g., 3GPP or 3GPP2. Wireless bearer service 320 is realized by a radio access bearer service 330 and a core network bearer service 332. Radio access bearer service 330 provides transport of traffic data between access terminal 110 and access network 120. Core network bearer service 332 provides transport of traffic data between access network 120 and IP gateway 140.

Access terminal 110 may exchange application layer data with remote terminal 170 via one or more flows. For example, a VoIP call between access terminal 110 and remote terminal 170 may utilize one or more RTP flows for traffic data and a SIP flow for signaling. The RTP and SIP flows may be associated with different ports at the transport layer and may be carried by an IP flow.

In general, access terminal 110 may have any number of IP flows, e.g., one IP flow for a VoIP call and another IP flow for data connectivity. Each IP flow is a stream of IP packets that matches a set of one or more packet filters in a traffic filter template (TFT). A packet filter may identify packets based on IP address, port number, etc. The IP flows may be sent via one or more RLP instances between access terminal 110 and access network 120 and via one or more A10 connections between access network 120 and IP gateway 140. An RLP instance may also be called an RLP flow.

FIGS. 2 and 3 show the protocol stacks and QoS architecture for communication between access terminal 110 and remote terminal 170. Access terminal 110 may also communicate with access terminal 112 instead of remote terminal 170. In this case, wireless bearer service 320, radio access bearer service 330, and core network bearer service 332 may be established for access terminal 112 in similar manner as for access terminal 110.

As shown in FIG. 3, QoS requirements for a given service are typically specified at the application level to achieve satisfactory performance. End-to-end QoS may be negotiated using SIP or some other protocol at the application level. QoS may then be negotiated on a hop-by-hop basis in order to meet the end-to-end QoS requirements. The QoS for IP flows may be negotiated using packet data QoS signaling, which resembles RSVP messages. The QoS for RLP instances may be negotiated via radio QoS signaling. The QoS for A10 connections may be negotiated via A11 QoS signaling.

Access terminal 110 may request QoS for a particular IP flow from access network 120. Access terminal 110 may assign a unique reservation label to the IP flow and may use the reservation label to identify the IP flow and the QoS request. The reservation label may be considered as an identifier for the IP flow.

In HRPD, QoS is granted for RLP instances. The desired QoS for an RLP instance may be specified by a set of QoS parameters, which is referred to as a QoS profile. To reduce signaling, some commonly used QoS profiles (or sets of QoS parameters) may be predefined and assigned unique ProfileIDs. A ProfileID may also be called a FlowProfileID, etc. A given ProfileID may identify a specific QoS profile, which may correspond to a specific set of QoS parameters. A QoS request may include a ProfileID for a desired QoS profile, instead of the entire set of QoS parameters, which may reduce signaling. In general, a QoS request may include any number of QoS profiles, which may be given in an order of preference by access terminal 110. Access network 120 may receive the QoS request and grant one QoS profile in the request.

An IP flow may thus be identified by a reservation label and may be associated with a TFT and an A10 connection. There is a one-to-one mapping between IP flow, reservation label, TFT, and A10 connection. An RLP instance may be associated with a QoS profile that may be identified by a ProfileID. Each IP flow may be mapped to a different RLP instance, or multiple IP flows may be mapped to the same RLP instance. An RLP instance may carry any number of IP flows whose QoS can be satisfied by the QoS profile granted for the RLP instance.

Figure 4:
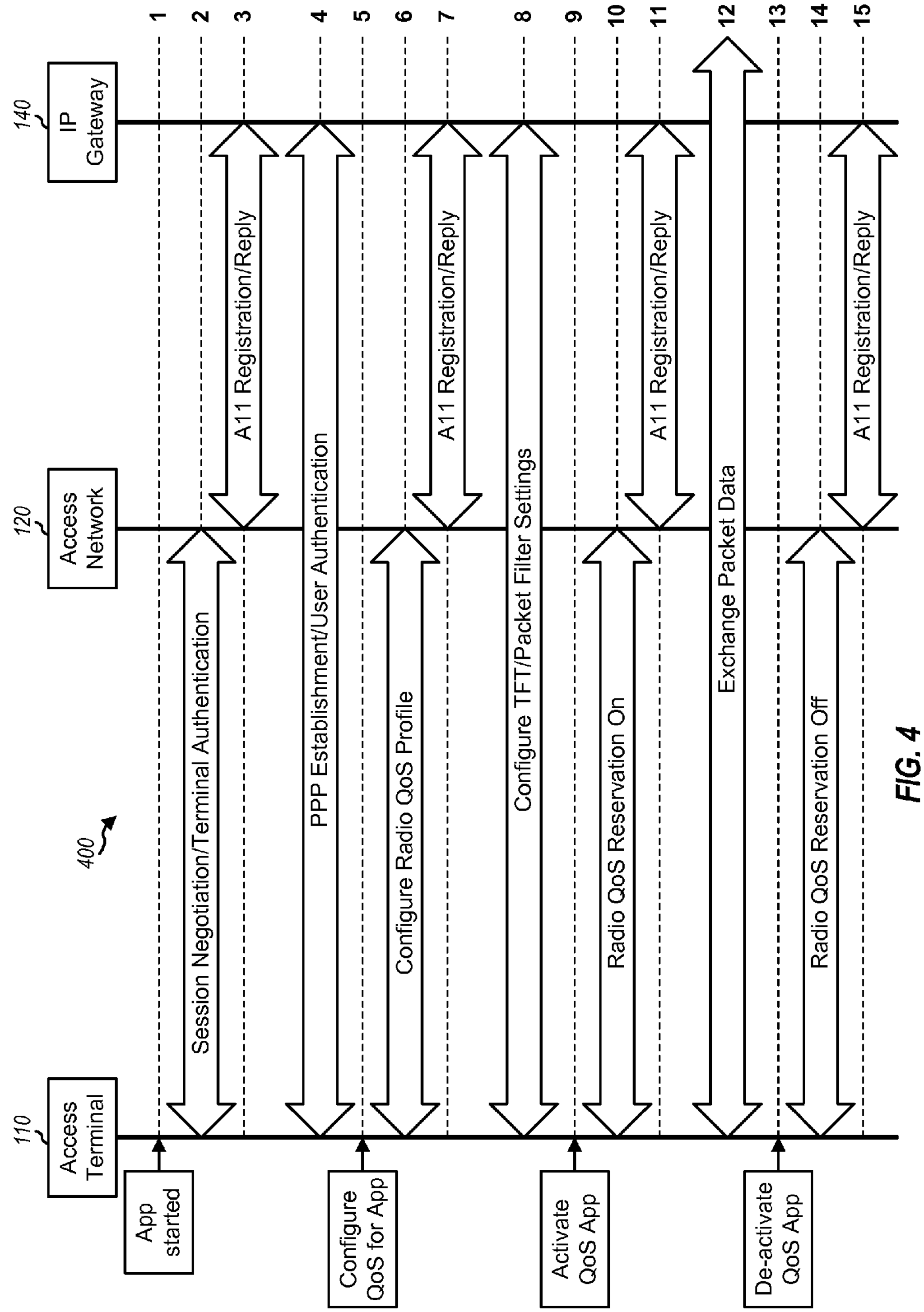
FIG. 4 shows a call flow for a data call with QoS.

FIG. 4 shows a call flow 400 for a data call with QoS. Initially, an application at access terminal 110 initiates a data call (step 1). In response, access terminal 110 performs session negotiation with access network 120 to set up a radio link and also performs terminal authentication to authenticate the access terminal to the access network (step 2). Access network 120 then exchanges A11 signaling with IP gateway 140 to establish an A10 connection that will carry traffic data for access terminal 110 (step 3). Access terminal 110 also performs PPP negotiation with IP gateway 140 to (a) establish, configure, and test a data-link connection between access terminal 110 and IP gateway 140, (b) authenticate a user of access terminal 110, (c) update the user's allowed QoS profiles in access network 120 and IP gateway 140, and (d) configure one or more network layer protocols, e.g., IP version 4 (IPv4) or IP version 6 (IPv6) (step 4).

An indication to configure QoS for an IP flow is received at access terminal 110 (step 5). The IP flow is identified by a reservation label and is associated with a TFT of packet filters. Access terminal 110 determines a QoS profile that can satisfy the required QoS for the IP flow. Access terminal 110 then exchanges radio QoS signaling with access network 120 to configure QoS, as described below (step 6). Access network 120 also exchanges A11 QoS signaling with IP gateway 140 to create any A10 connections needed for the IP flow (step 7). Access terminal 110 then exchanges RSVP messages with IP gateway 140 to configure the TFT for the IP flow (step 8). This TFT includes packet filters used to identify packets for the IP flow.

An indication to activate QoS for the IP flow is thereafter received at access terminal 110 (step 9). Access terminal 110 then exchanges signaling with access network 120 to set the reservation label in an open state (step 10). Step 10 results in access network 120 granting sufficient radio resources to achieve the QoS profile for the reservation label. Step 10 essentially activates the QoS for the IP flow. Access network 120 also exchanges A11 QoS signaling with IP gateway 140 to indicate that the reservation label is turned on and that billing can commence (step 11).

Access terminal 110 may thereafter exchange traffic data for the IP flow via IP gateway 140 (step 12). The traffic data would achieve the QoS negotiated with access network 120. After some time later, an indication to deactivate QoS for the IP flow is received at access terminal 110 (step 13). Access terminal 110 then exchanges signaling with access network 120 to set the reservation label in a closed state, which deactivates the QoS for the IP flow (step 14). Access network 120 also exchanges A11 QoS signaling with IP gateway 140 to indicate that the reservation label is turned off (step 15).

Figure 5:
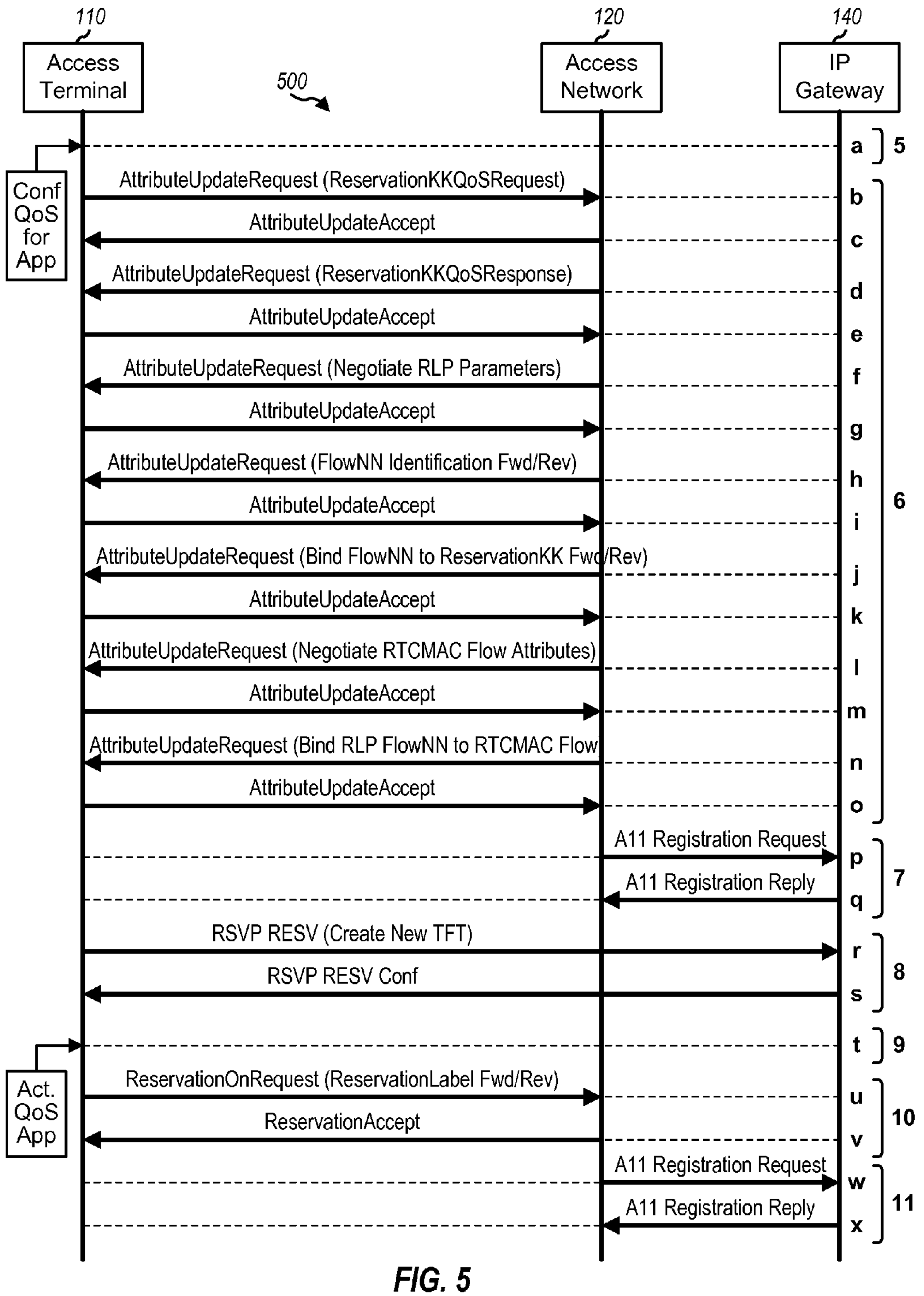
FIG. 5 shows a call flow for configuring QoS for a data flow.

FIG. 5 shows a call flow 500 for configuring and activating QoS for an IP flow. Call flow 500 shows some of the steps in call flow 400 in FIG. 4 in greater detail. Call flow 500 may be used to configure QoS for an RLP instance, and to map the IP flow/reservation label to the RLP instance.

An indication to configure QoS for the IP flow is received at access terminal 110 (step a). Access terminal 110 selects one or more ProfileIDs that can satisfy the required QoS for the IP flow. Access terminal 110 then sends an AttributeUpdateRequest (AUR) message to access network 120 to request QoS (step b). The AUR message is a message in Generic Attribute Update Protocol (GAUP) used to update attributes for various protocols. The AUR message in step b includes an ReservationKKQoSRequest attribute containing the one or more ProfileIDs selected by access terminal 110. These ProfileIDs may be given in an order of preference by access terminal 110. Each ProfileID is a choice that may be selected by access network 120 for the QoS request. Access network 120 returns an AttributeUpdateAccept (AUA) message to acknowledge the AUR message in step b (step c). The AUR message is another message in GAUP. Access network 120 then sends an AUR message with a ReservationKKQoSResponse attribute containing a ProfileID, if any, accepted by the access network (step d). Access terminal 110 returns an AUA message to acknowledge the AUR message in step d (step e).

Access network 120 determines radio resources needed to achieve the QoS for the granted QoS profile. Access network 120 then sends one or more AUR messages to negotiate RLP parameters (step f), and access terminal 110 returns an AUA message to accept the RLP parameters (step g). Access network 120 then sends an AUR message with FlowNN Identification Fwd/Rev attributes to activate the RLP parameters (step h), which is acknowledged by access terminal 110 (step i).

Access network 120 then sends an AUR message with Bind FlowNN to ReservationKK Fwd/Rev attributes to inform access terminal 110 which RLP instance to use for the QoS request/reservation label (step j). Access terminal 110 returns an AUA message to confirm the mapping of the reservation label to the RLP instance (step k). Access network 120 may also negotiate RTCMAC instances/flows, if any, required to support the QoS request (step 1), and access terminal 110 returns an AUA message to accept the RTCMAC parameters (step m). Access network 120 then sends an AUR message to bind the RLP instance to the RTCMAC instance (step n).

Access terminal 110 returns an AUA message to confirm the mapping of the RLP instance to the RTCMAC instance (step o).

Access network 120 also sends to IP gateway 140 an A11-Registration Request message to initiate establishment of an A10 connection for access terminal 110 (step p). IP gateway 140 accepts the A10 connection request, creates a binding record for the A10 connection, and returns an A11-Registration Reply message to access network 120 (step q). Step p and q may be performed at any time after step b.

Access terminal 110 processes the QoS request from the application and constructs a TFT with appropriate packet filters. Access terminal 110 then sends an RSVP RESV message containing the packet filters to IP gateway 140 (step r). IP gateway 140 receives the RSVP RESV message, creates a new TFT corresponding to an IP address for access terminal 110, updates the TFT with the packet filters, and returns an RSVP RESV Conf message to indicate successful processing of the RSVP RESV message (step s).

After completing QoS configuration, access terminal 110 may receive a request to activate QoS for the IP flow (step t). Access terminal 110 then sends a ReservationOnRequest message with the reservation label for the IP flow to access network 120 to activate QoS for the IP flow (step u). Access network 120 then returns an ReservationAccept message to acknowledge the QoS activation request (step v). Access network 120 may send an A11-Registration Request message for IP flow admission control (step v) and IP gateway 140 may then respond with an A11-Registration Reply message (step w). Steps p and q establish the A10 connection and map the A10 connection to the reservation label. Steps v and w inform IP gateway 140 that the reservation label is turned on and billing can commence.

FIG. 5 also shows the mapping of the steps in call flow 500 to the steps in call flow 400 in FIG. 4. Step a in FIG. 5 corresponds to step 5 in FIG. 4. Steps b through o in FIG. 5 correspond to step 6 in FIG. 4. Steps p and q in FIG. 5 correspond to step 7 in FIG. 4. Steps r and s in FIG. 5 correspond to step 8 in FIG. 4. Step t in FIG. 5 corresponds to step 9 in FIG. 4. Steps u and v in FIG. 5 correspond to step 10 in FIG. 4. Steps w and x in FIG. 5 correspond to step 11 in FIG. 4.

As shown in FIGS. 4 and 5, access terminal 110, access network 120, and IP gateway 140 may exchange many messages in order to configure QoS for an IP flow. Steps 6, 7 and 8 in FIG. 4 may be repeated whenever a new IP flow is added or an existing IP flow is removed. Steps 6 and 7 may be performed whenever QoS is changed. Configuring QoS for an application may add delays to call setup and consume valuable radio resources.

To expedite call setup and possibly reduce signaling overhead, QoS may be configured ahead of time and may be activated when a call is started. QoS may be deactivated at the end of the call and may be available for the next call.

Wireless network 100 may support multiple rate sets for a VoIP call. For example, wireless network 100 may support two rate sets:

Rate set 1 (RS1)—includes data rates of 1.2, 2.4, 4.8 and 9.6 Kbps, and

Rate set 2 (RS2)—includes data rates of 1.8, 3.6, 7.2 and 14.4 Kbps.

RS1 may be used for various audio encoders/decoders (codecs) such as Enhanced Variable Rate Codec (EVRC), Selectable Mode Vocoder (SMV), Fourth Generation Vocoder (4GV), etc. RS2 may be used for Adaptive Multi Rate (AMR) vocoder, etc.

Each rate set may have certain QoS requirements. RS2 will likely have higher QoS requirements (e.g., require more bandwidth) than RS1 because of the higher peak data rate, which is 14.4 Kbps for RS2 versus 9.6 Kbps for RS1. A QoS profile with appropriate QoS parameters may be defined for RS1 to achieve satisfactory performance for a VoIP call with RS1. Another QoS profile with appropriate QoS parameters may be defined for RS2 to achieve satisfactory performance for a VoIP call with RS2. These QoS profiles may be assigned different ProfileIDs. For example, a ProfileID of 256 is defined for conversational Rate Set 1 interactive speech, full rate, with no frame bundling. A ProfileID of 257 is defined for conversational Rate Set 2 interactive speech, full rate, with no frame bundling. ProfileIDs of 256, 257, and other values are described in a document 3GPP2 C.P1001-F, entitled "Administration of Parameter Value Assignments for cdma2000 Spread Spectrum Standards," Jun. 26, 2006, which is publicly available.

Figure 6:
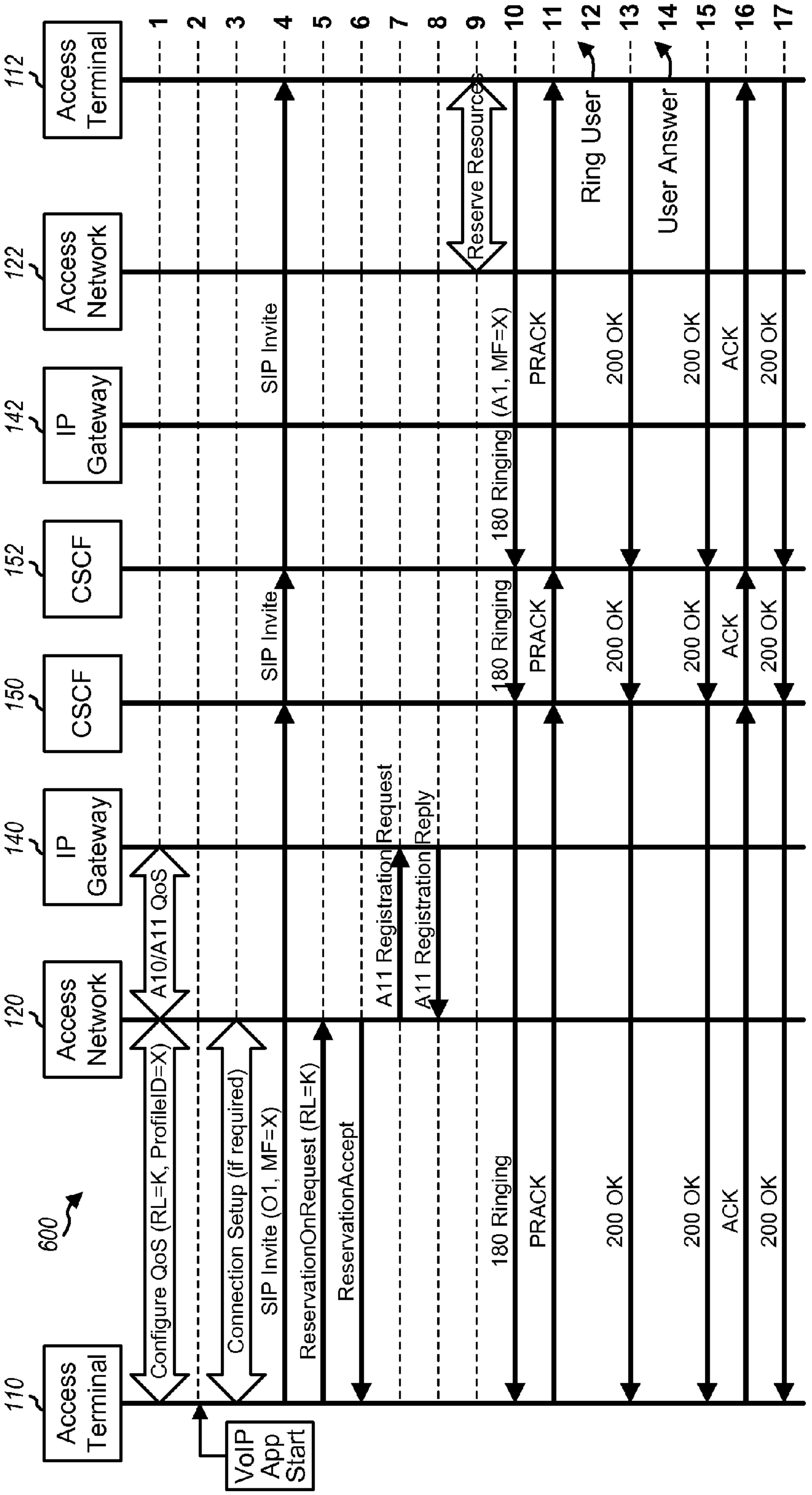
FIG. 6 shows a call flow for a mobile-originated (MO) VoIP call with preconfigured QoS.

FIG. 6 shows a call flow 600 for a mobile-originated (MO) VoIP call with preconfigured QoS. Initially, access terminal 110 communicates with access network 120 and IP gateway 140 to configure QoS for an IP flow (step 1). This IP flow is assigned a reservation label of K (or RL=K) and is mapped to an RLP instance with a ProfileID of X for rate set x (RSx). For example, X may be equal to 256 for RS1 or 257 for RS2. An A10 connection may also be established for the IP flow via A11 signaling (also step 1). Step 1 may be performed at any time prior to the MO VoIP call.

Thereafter, a VoIP application at access terminal 110 issues a request to call remote access terminal 112 (step 2). Access terminal 110 may then exchange signaling with access network 120 to set up a radio link and may also exchange signaling with IP gateway 140 to establish a PPP session, if required (step 3). Access terminal 110 then sends a SIP Invite message to access terminal 112 (step 4). This message may contain one or more media formats supported by access terminal 110, which may be given in an order of preference by access terminal 110. Each media format may correspond to a specific QoS profile. In the example shown in FIG. 6, the SIP Invite message includes media format X (MF=X) corresponding to the preconfigured ProfileID X.

Access terminal 110 also sends a ReservationOnRequest message with reservation label K to access network 120 to activate QoS for this reservation label (step 5). Access network 120 grants sufficient radio resources to achieve the QoS for ProfileID X to which reservation label K is mapped. Access network 120 then returns a ReservationAccept message to acknowledge the QoS activation request (step 6). Access network 120 also sends an A11-Registration Request message to IP gateway 140 for IP flow admission control (step 7), and IP gateway 140 returns an A11-Registration Reply message (step 8).

Access terminal 112 receives the SIP Invite message from access terminal 110 and may exchange signaling with access network 122 and/or IP gateway 142 to reserve resources (step 9). Access terminal 112 then returns a SIP 180 Ringing message that may include one or more media formats supported by access terminal 112, which may be given in an order of preference by access terminal 112 (step 10). In this example, both access terminals 110 and 112 support and prefer the same media format, which is X. Access terminal 110 receives the SIP 180 Ringing message and returns a SIP PRACK message, which is a provisional acknowledgement for the SIP 180 Ringing message (step 11). Access terminal 112 then rings its user (step 12) and also returns a SIP 200 OK message to acknowledge the PRACK message (step 13). The user answers the ring (step 14), and access terminal 112 sends a SIP 200 OK message to indicate that the user has answered (step 15). Access terminal 110 returns a SIP ACK message to acknowledge the SIP 200 OK in step 15 (step 16). Access terminal 112 then sends a SIP 200 OK message to acknowledge the SIP Invite message received in step 4 (step 17). Access terminals 110 and 112 may thereafter exchange traffic data for the VoIP call in accordance with the QoS for the preconfigured reservation label.

FIG. 6 shows a case in which both access terminals 110 and 112 support the rate set covered by the preconfigured reservation label. In this case, a single ReservationOnRequest message may be sent in step 5 to activate the reservation label. This may reduce signaling overhead to configure QoS and may also reduce call setup delay.

Figure 7:
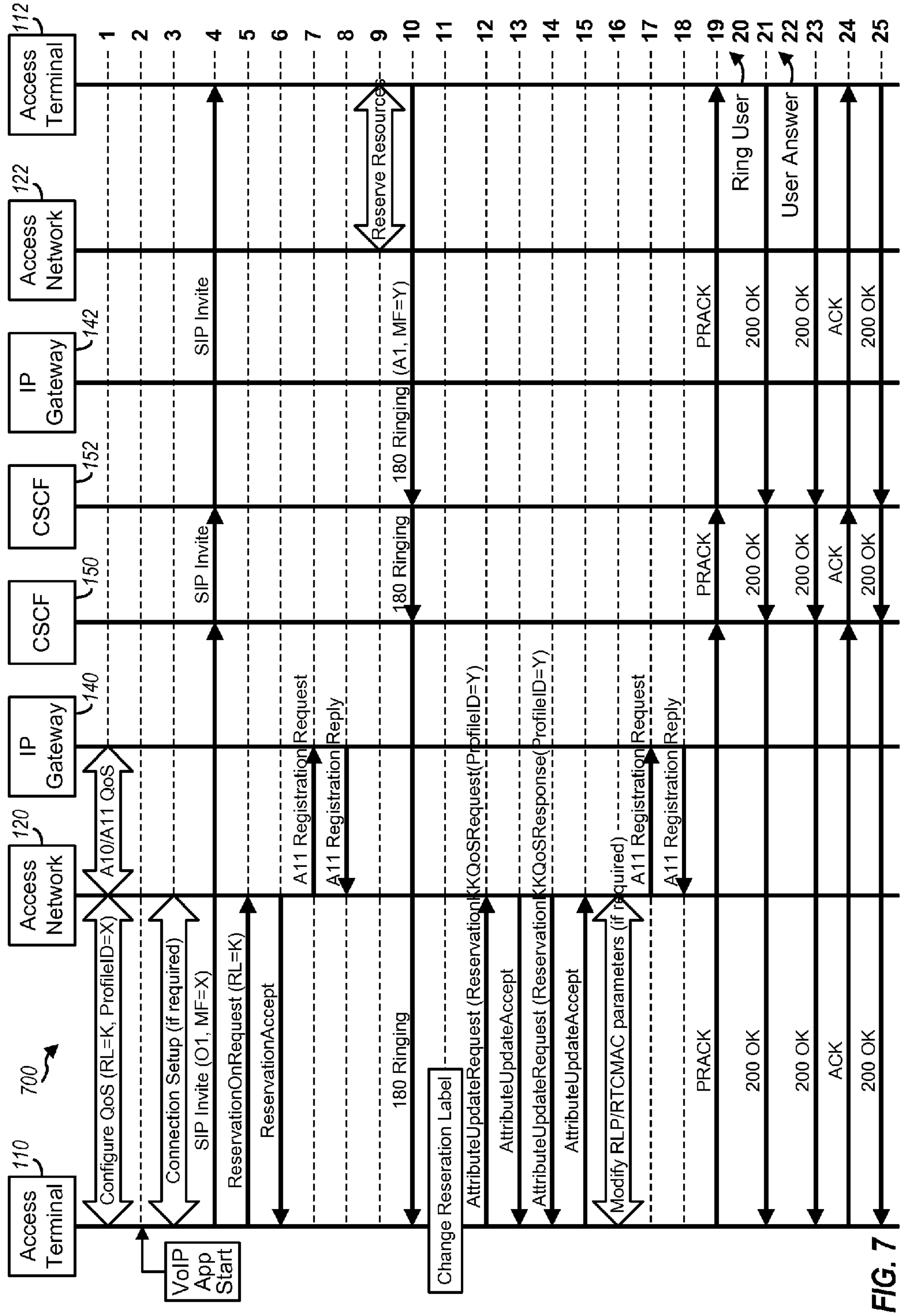
FIG. 7 shows a call flow for an MO VoIP call with QoS reconfiguration.

FIG. 7 shows a call flow 700 for an MO VoIP call with QoS reconfiguration. Steps 1 through 10 of call flow 700 are the same as steps 1 through 10, respectively, of call flow 600 in FIG. 6. In this example, the preconfigured reservation label for access terminal 110 is mapped to an RLP instance with a ProfileID of X for rate set x (RSx), e.g., ProfileID of 256 for RS1, and access terminal 112 supports another rate set y (RSy) associated with a different ProfileID of Y, e.g., ProfileID of 257 for RS2.

Access terminal 110 receives the SIP 180 Ringing message from access terminal 112 (step 10), determines that access terminal 112 supports media format Y for RSy, and determines that a change in QoS is needed for the reservation label (step 11). Access terminal 110 then sends to access network 120 an AUR message with an ReservationKKQoSRequest attribute containing ProfileID Y for RSy supported by access terminal 112 (step 12). Access network 120 returns an AUA message to acknowledge the AUR message (step 13). Access network 120 also sends an AUR message with a ReservationKKQoSResponse attribute containing ProfileID Y accepted by the access network (step 14). Access terminal 110 returns an AUA message to acknowledge the AUR message (step 15). Access terminal 110 may exchange signaling with access network 120 to modify RLP and/or RTCMAC parameters, if required (step 16). Step 16 may include steps f through o of call flow 500 in FIG. 5. Access network 120 sends to IP gateway 140 an A11-Registration Request message to modify the existing A10 connection, e.g., to change billing (step 17). IP gateway 140 modifies the A10 connection and returns an A11-Registration Reply message to access network 120 (step 18). The same reservation label and TFT may be used for the A10 connection.

Steps 19 through 25 of call flow 700 are the same as steps 11 through 17, respectively, of call flow 600 in FIG. 6.

Figure 8:
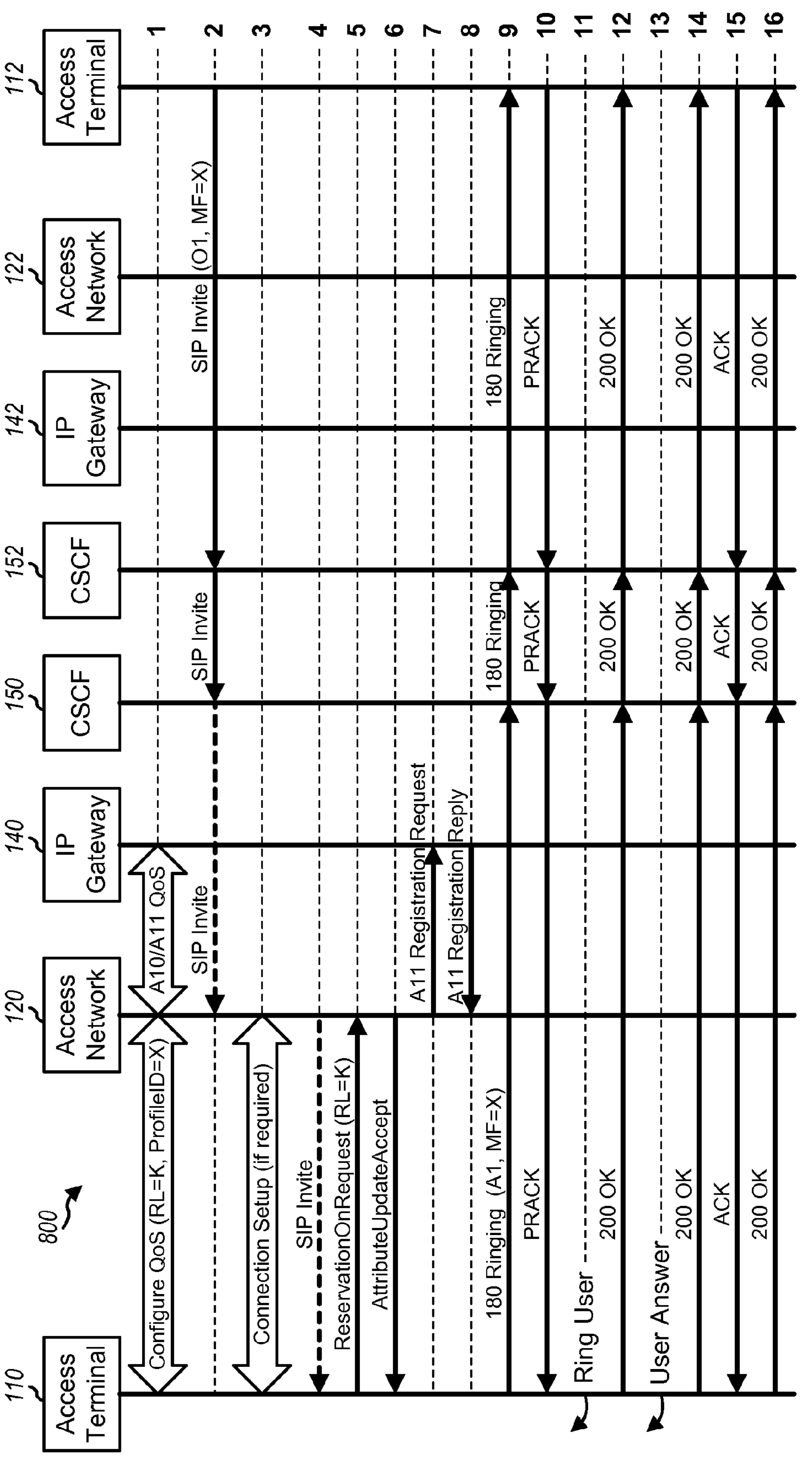
FIG. 8 shows a call flow for a mobile-terminated (MT) VoIP call with preconfigured QoS.

FIG. 8 shows a call flow 800 for a mobile-terminated (MT) VoIP call with preconfigured QoS. Initially, access terminal 110 communicates with access network 120 and IP gateway 140 to configure QoS for an IP flow (step 1). This IP flow is assigned a reservation label of K and is mapped to an RLP instance with a ProfileID of X for rate set x (RSx). An A10 connection may also be established for the IP flow via A11 signaling (also step 1).

Thereafter, remote access terminal 112 sends a SIP Invite message to access network 120 to call access terminal 110 (step 2). This message may contain one or more media formats supported by access terminal 112, which may be given in an order of preference by access terminal 112. In the example shown in FIG. 8, the SIP Invite message includes media format X corresponding to the preconfigured ProfileID X. Access network 120 may page access terminal 110, if required. Access terminal 110 may then exchange signaling with access network 120 to set up a radio link and may also exchange signaling with IP gateway 140 to establish a PPP session, if required (step 3). Access network 120 then forwards the SIP Invite message to access terminal 110 (step 4). The SIP Invite message may be sent as data payload in IP packets (or inband signaling) from CSCF 150 to access network 120 and then to access terminal 110, which is shown by the dashed lines.

Access terminal 110 receives the SIP Invite message and determines that access terminal 112 supports media format X for RSx. Access terminal 110 then sends a ReservationOnRequest message with reservation label K to access network 120 to activate QoS for this reservation label (step 5). Access network 120 grants sufficient radio resources to achieve the QoS for ProfileID X to which reservation label K is mapped. Access network 120 then returns a ReservationAccept message to acknowledge the QoS activation request (step 6). Access network 120 also sends an A11-Registration Request message to IP gateway 140 for IP flow admission control (step 7), and IP gateway 140 returns an A11-Registration Reply message (step 8).

Access terminal 110 returns a SIP 180 Ringing message that may include media format X supported by access terminal 110 (step 9). In this example, both access terminals 110 and 112 support the same rate set, which is RSx. Access terminal 112 then sends to access terminal 110 a SIP PRACK message to provisionally acknowledge the SIP 180 Ringing message (step 10). Access terminal 110 then rings its user (step 11) and also returns a SIP 200 OK message to acknowledge the PRACK message (step 12). The user answers the ring (step 13), and access terminal 110 sends a SIP 200 OK message to indicate that the user has answered (step 14). Access terminal 112 returns a SIP ACK message to acknowledge the SIP 200 OK in step 14 (step 15). Access terminal 110 then sends a SIP 200 OK message to acknowledge the SIP Invite message received in step 4 (step 16). Access terminals 110 and 112 may thereafter exchange traffic data for the VoIP call in accordance with the QoS for the preconfigured reservation label.

Figure 9:
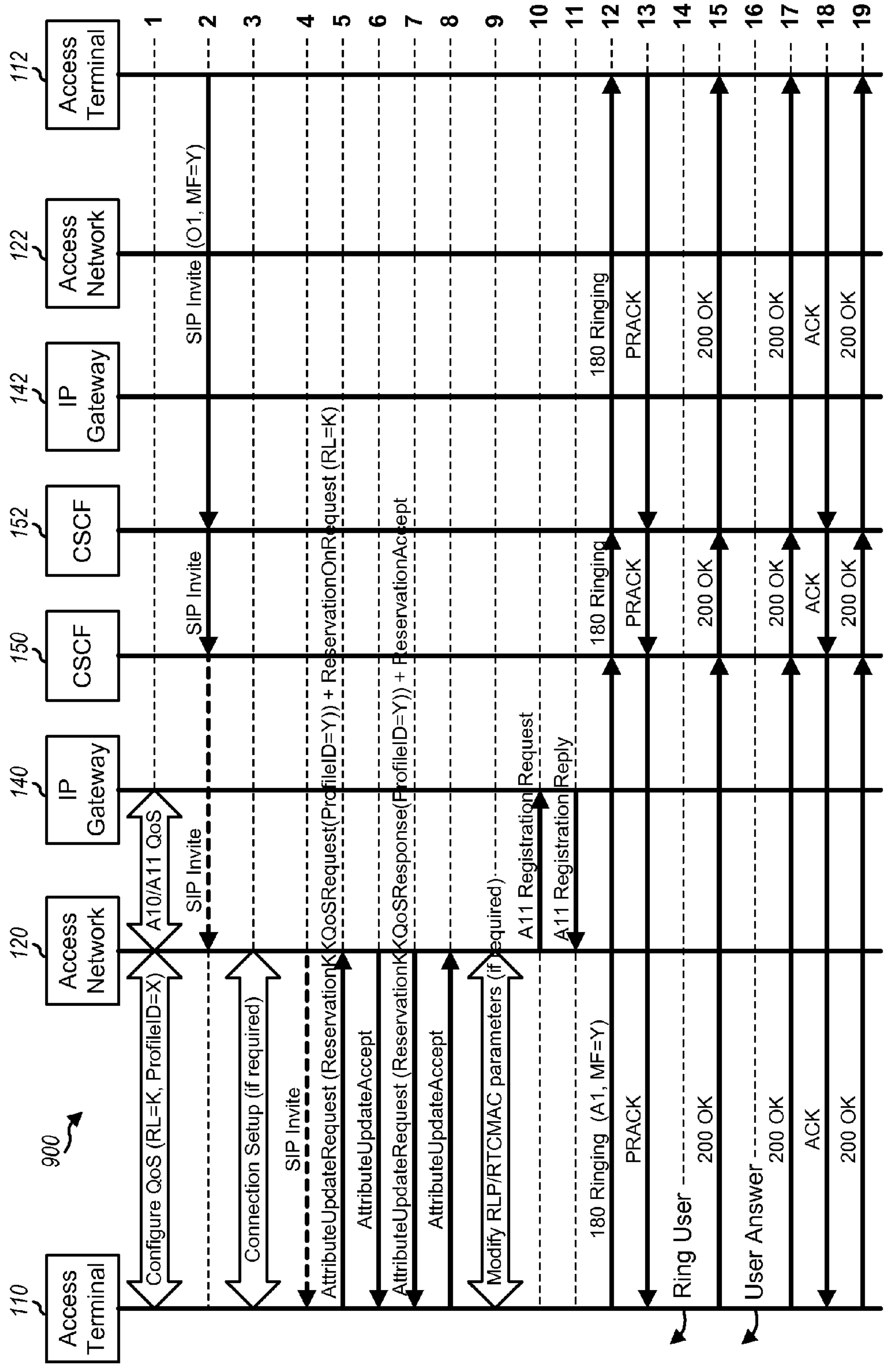
FIG. 9 shows a call flow for an MT VoIP call with QoS reconfiguration.

FIG. 9 shows a call flow 900 for an MT VoIP call with QoS reconfiguration. Steps 1 through 4 of call flow 900 are similar to steps 1 through 4, respectively, of call flow 800 in FIG. 8. In this example, the preconfigured reservation label for access terminal 110 is mapped to an RLP instance with a ProfileID of X for RSx, e.g., ProfileID of 256 for RS1, and access terminal 112 supports another rate set RSy associated with a different ProfileID of Y. e.g., ProfileID 257 for RS2.

Access terminal 110 receives the SIP Invite message from access terminal 112 (step 4), determines that access terminal 112 supports media format Y for RSy, and determines that a change in QoS is needed for the reservation label. Access terminal 110 then sends to access network 120 (a) an AUR message with an ReservationKKQoSRequest attribute containing ProfileID Y for RSy, which is supported by access terminal 112, and (b) a ReservationOnRequest message with reservation label K to active the QoS for the reservation label (step 5). The two messages may sent in a bundle. Access network 120 returns an AUA message to acknowledge the AUR message (step 6). Access network 120 then sends (a) an AUR message with a ReservationKKQoSResponse attribute containing ProfileID Y accepted by the access network and (b) a ReservationAccept message to acknowledge the QoS activation request (step 7). Access terminal 110 returns an AUA message to acknowledge the AUR message (step 8). Access terminal 110 may exchange signaling with access network 120 to modify RLP and/or RTCMAC parameters, if required (step 9). Step 9 may include steps f through o of call flow 500 in FIG. 5. Access network 120 sends to IP gateway 140 an A11-Registration Request message to modify the existing A10 connection (step 10). IP gateway 140 modifies the A10 connection and returns an A11-Registration Reply message to access network 120 (step 11).

Steps 12 through 19 of call flow 900 are the same as steps 9 through 16, respectively, of call flow 800 in FIG. 8.

As shown in FIGS. 6 through 9, QoS may be preconfigured for access terminal 110. In general, the preconfigured QoS may be for any QoS profile/ProfileID. In one design, the preconfigured QoS is for a rate set that is more likely to be used for a new call, which may reduce the likelihood of having to reconfigure QoS for the new call. For example, RS1 may be used for a large percentage of the time, and RS2 may be used for a small percentage of the time. The preconfigured QoS may then be for ProfileID of 256 for RS1. If a call uses a rate set (e.g., RS2) that is less likely to be used, then QoS may be configured for a more likely rate set (e.g., RS1) at the end of the call. For the examples shown in FIGS. 7 and 9, RS1 may be more likely, the preconfigured QoS may be for ProfileID of 256 (or X=256), RS2 may be used for the call, the reconfigured QoS may be for ProfileID of 257 (or Y=257), and ProfileID of 256 may be configured at the end of the call. This design is referred to as a “switch back” design.

In another design, the preconfigured QoS is for a rate set that was used in the last call, which may avoid signaling overhead unless and until QoS reconfiguration is needed. The likelihood of calling the same party may be higher than for any other party. In this case, retaining the QoS for the last call may reduce the likelihood of having to reconfigure QoS. For the examples shown in FIGS. 7 and 9, the preconfigured QoS may be for ProfileID of 256 for RS1, RS2 may be used for the call, the reconfigured QoS may be for ProfileID of 257, and ProfileID of 257 may be used for the call and retained at the end of the call. This design is referred to as a “no switch back” design.

The preconfigured QoS may be for a QoS profile provisioned on access terminal 110. Access terminal 110 may be provisioned with a list of one or more QoS profiles. Each QoS profile may support a different rate set or a different service. The list may include a single QoS profile for voice, which may support a single rate set, e.g., RS1. In this case, QoS may be preconfigured for this single rate set. The list may also include multiple QoS profiles for multiple rate sets. In this case, one rate set may be selected from the list, and QoS may be preconfigured for the selected rate set.

As shown in FIGS. 6 through 9, QoS may be preconfigured prior to an MO call or an MT call. QoS may also be activated early in an MO call, without knowing the rate set(s) supported by remote access terminal 112. The rate set to use for an MO call may be determined after receiving the SIP 180 Ringing message in step 8 in FIG. 7. The rate set to use for an MT call may be determined after receiving the SIP Invite message in step 4 in FIG. 9. If the preconfigured (and possibly activated) QoS is for a rate set that is different than the rate set selected for use, then QoS may be reconfigured in real-time once the selected rate set is known. Access terminal 110 may exchange signaling with access network 120 to reconfigure QoS to switch rate set. The same signaling sequence may used for switching from RS1 to RS2 and also for switching from RS2 to RS1.

QoS reconfiguration may be achieved in various manners. In one design, a single reservation label is used for an IP flow regardless of whether or not QoS is reconfigured, as shown in FIGS. 7 and 9. The reservation label may be mapped to the preconfigured QoS. If QoS reconfiguration is needed, then the QoS for this reservation label may be modified by exchanging signaling with access network 120. This design may reduce overhead since only one reservation label is maintained.

In another design, different reservation labels are used for IP flows associated with different QoS profiles. In this design, a first reservation label for a first IP flow may be mapped to a first QoS profile that is preconfigured. If QoS reconfiguration is needed, then a second reservation label for a second IP flow mapped to a second QoS profile may be configured. If the configuration for the second reservation label is successful, then the first reservation label may be closed, and the second reservation label may be activated. If the configuration for the second reservation label is unsuccessful, then the first reservation label may be activated, and the second reservation label may be dropped. This design allows the access terminal to communicate using the first reservation label (a) while configuring the second reservation label and (b) if the configuration for the second reservation label fails. QoS reconfiguration may also be performed in other manners.

Access terminal 110 may communicate in different manners depending on whether or not QoS reconfiguration is performed. If QoS reconfiguration is not needed (e.g., as shown in FIGS. 6 and 8), then access terminal 110 may communicate using the preconfigured QoS for an entire call. If QoS reconfiguration is needed (e.g., as shown in FIGS. 7 and 9), then access terminal 110 may communicate in different manners depending on the preconfigured QoS and the reconfigured QoS.

If the preconfigured QoS is for RS2 and RS1 is selected for use, then the preconfigured QoS may allocate more radio resources (e.g., more bandwidth) than needed for the selected RS1. In this case, access terminal 110 may communicate with access terminal 112 using the preconfigured QoS. Access terminal 110 may perform QoS reconfiguration at any time to switch from RS2 to RS1 to save radio resources, or may skip QoS reconfiguration altogether.

If the preconfigured QoS is for RS1 and RS2 is selected for use, then the preconfigured QoS may allocate insufficient radio resources for the selected RS2. In this case, access terminal 110 may perform QoS reconfiguration to switch from RS1 to RS2 to obtain sufficient radio resources (e.g., bandwidth) for RS2. Until QoS reconfiguration is completed and activated, access terminal 110 may communicate with access terminal 112 using the lower data rates in RS2, which are supported by the preconfigured QoS. For example, the preconfigured QoS may allocate sufficient radio resources for the peak data rate of 9.6 Kbps for RS1. If RS2 is selected for use, then access terminal 110 may operate with data rates of 1.8, 3.6, and 7.2 Kbps in RS2 and may avoid using the peak data rate of 14.4 Kbps until QoS is reconfigured and activated.

In the designs shown in FIGS. 6 through 9, QoS is preconfigured for one ProfileID and may be reconfigured during a call if needed. This design may be used for any call that can be supported by a single QoS profile. In another design, QoS is preconfigured for multiple ProfileIDs. A suitable ProfileID may then be selected for use for a call, e.g., by activating a reservation label mapped to this ProfileID.

In the designs described above, access terminal 110 requests QoS from access network 120, and access network 120 may grant or deny the QoS request. In another design, access network 120 can determine the required QoS for a call and can initiate QoS reconfiguration. For example, access network 120 may be informed of an appropriate ProfileID by a designated network entity, e.g., a Policy and Charging Rule Function (PCRF), and may then inform access terminal 110 to use appropriate RLP parameters for the call.

The techniques described herein may be used for any type of call with QoS. For example, the techniques may be used for VoIP calls, video calls, videoconference calls, etc.

Figure 10:
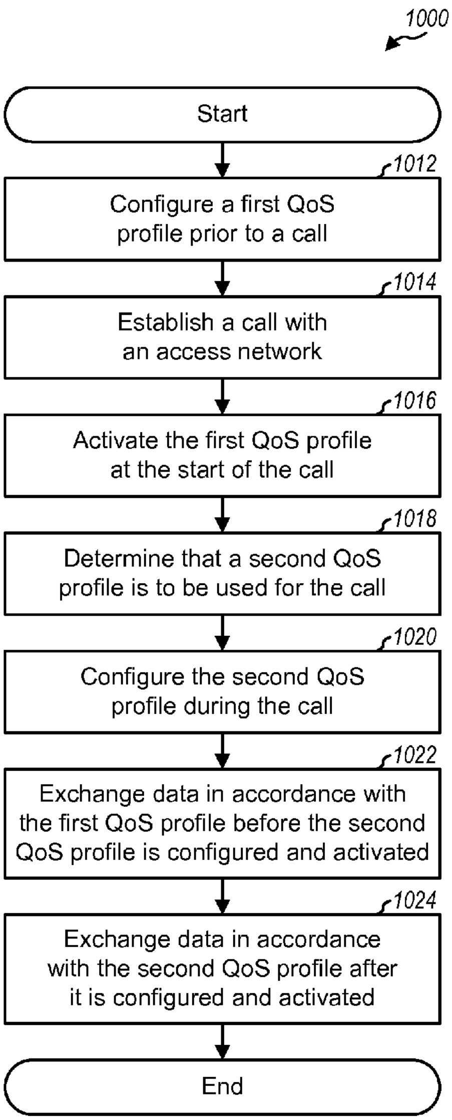
FIG. 10 shows a process performed by an access terminal for communication.

FIG. 10 shows a process 1000 performed by an access terminal for communication. The access terminal configures a first QoS profile prior to a call (block 1012). This may entail (a) exchanging signaling with an access network to provide the first QoS profile to the access network and (b) exchanging signaling with a gateway to set up packet filters used to identify data to be sent with the first QoS profile.

The access terminal thereafter establishes a call (e.g., originates or terminates a VoIP call) with the access network (block 1014). The access terminal may activate the first QoS profile at the start of the call, prior to determining that the second QoS profile is to be used for the call (block 1016). If the first QoS profile is appropriate for the call, then QoS does not need to be reconfigured for the call. However, the access terminal may determine that a second QoS profile is to be used for the call (block 1018). The access terminal may receive a message with at least one format or rate set supported by a remote/other terminal for the call. The access terminal may determine that the second QoS profile is to be used for the call based on the at least one format or rate set supported by the remote/other terminal. The access terminal then configures the second QoS profile during the call (block 1020). The access terminal may exchange data in accordance with the first QoS profile before the second QoS profile is configured and activated (block 1022). The access terminal may exchange data in accordance with the second QoS profile after it is configured and activated (block 1024).

The first QoS profile may be for a rate set that is more likely to be used for the call, a rate set that is used for a prior call, etc. The second QoS profile may be for a rate set that is selected for use for the current call. Each rate set may include at least one data rate usable for communication. The first QoS profile may support a first rate set having a first peak data rate, e.g., 9.6 Kbps. The second QoS profile may support a second rate set having a second peak data rate, e.g., 14.4 Kbps. The access terminal may then exchange data based on at least one data rate that is lower than or equal to the first peak data rate before the second QoS profile is configured and activated.

The access terminal may configure the first QoS profile for a data flow (e.g., an IP flow) prior to the call and may configure the second QoS profile for the same data flow during the call. Alternatively, the access terminal may configure the first QoS profile for a first data flow prior to the call and may configure the second QoS profile for a second data flow during the call. In this case, the access terminal may exchange data (a) via the second data flow if the second QoS profile is successfully configured and activated or (b) via the first data flow if the second QoS profile is not successfully configured and activated. Each data flow may be identified by a reservation label.

The access terminal may configure the first QoS profile at the end of the call. The access terminal may also retain the second QoS profile at the end of the call for possible use for a next call.

Figure 11:
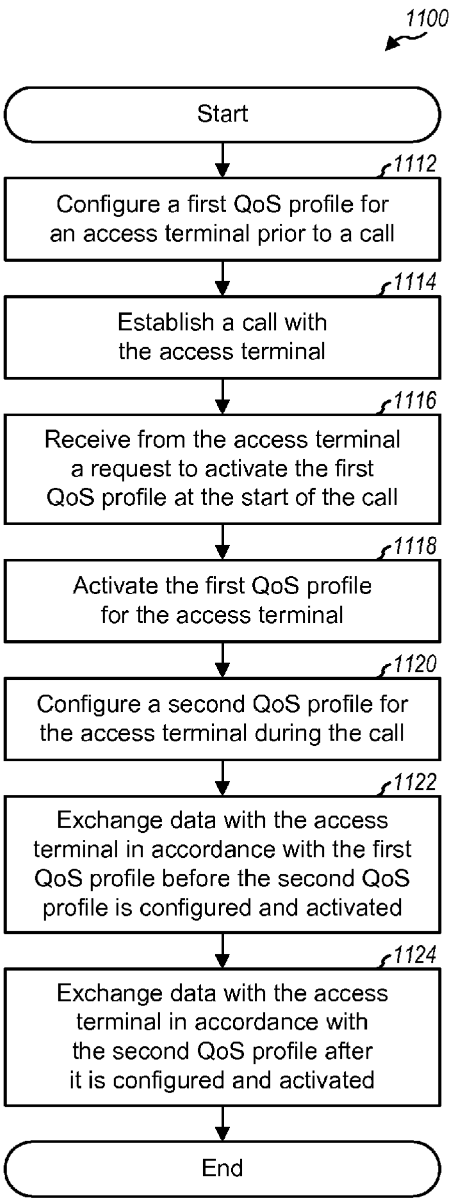
FIG. 11 shows a process performed by an access network.

FIG. 11 shows a process 1100 performed by an access network to support communication. The access network configures a first QoS profile for an access terminal prior to a call (block 1112). Thereafter, a call is established between the access terminal and access network (block 1114). The access network may receive from the access terminal a request to activate the first QoS profile at the start of the call, e.g., for an MO call (block 1116) and may then activate the first QoS profile for the access terminal (block 1118). If the first QoS profile is appropriate for the call, then QoS does not need to be reconfigured for the call. However, the access network may configure a second QoS profile for the access terminal during the call (block 1120). The access network may receive a request to configure the second QoS profile from the access terminal. Alternatively, the access network may determine that the second QoS profile is suitable for the call and may initiate configuration of the second QoS profile. In any case, the access network may exchange data with the access terminal in accordance with the first QoS profile before the second QoS profile is configured and activated (block 1122). The access network may exchange data with the access terminal in accordance with the second QoS profile after it is configured and activated (block 1124).

The techniques described herein allow for QoS configuration and activation even before an access terminal knows the QoS required for a call. The techniques also allow for communication using the preconfigured QoS while QoS reconfiguration is performed in real time. The techniques allow for communicating the change in QoS to the access network, so that proper admission control can be performed. The techniques can operate with different SIP procedures in a call setup process, which perform QoS reconfiguration if required, e.g., after hearing from the remote/other terminal. The QoS reconfiguration is symmetric regardless of the preconfigured QoS (or old rate set) and the reconfigured QoS (or new rate set). This symmetry may simplify processing at the access terminal and the access network for QoS reconfiguration.

Figure 12:
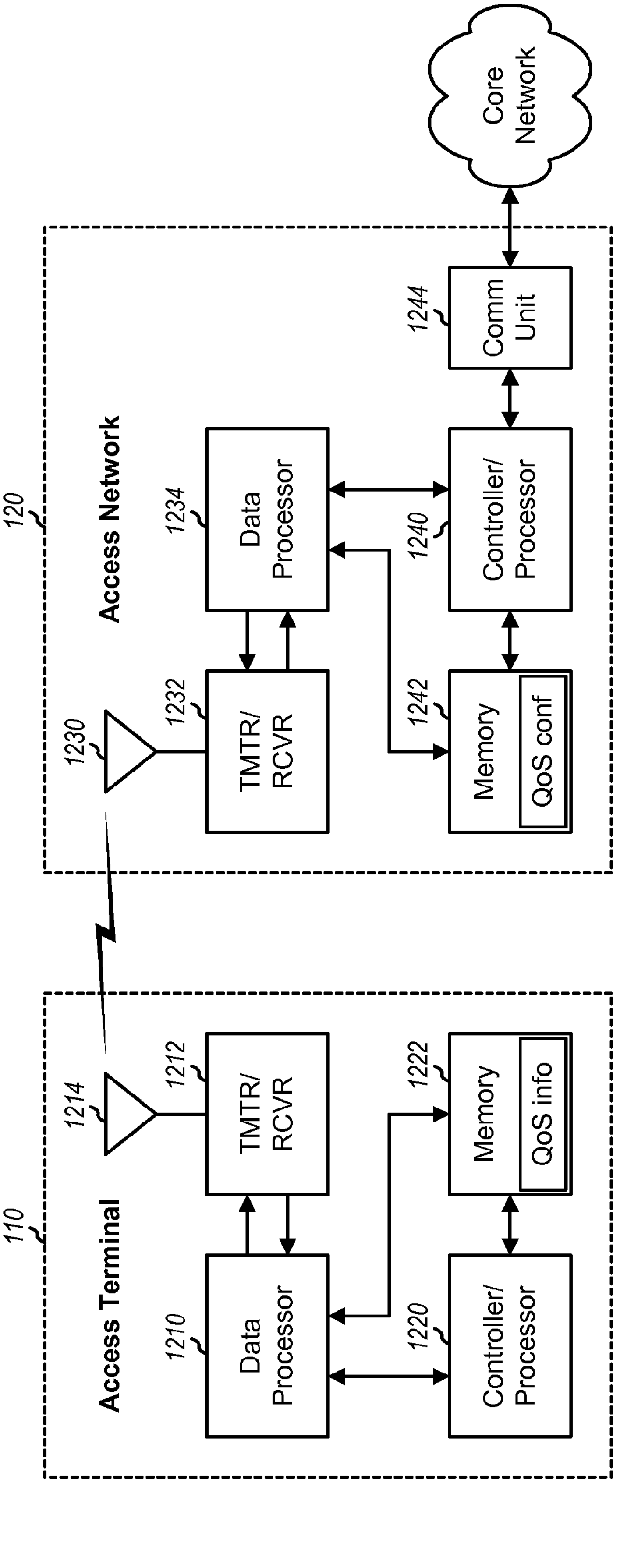
FIG. 12 shows a block diagram of the access terminal and access network.

FIG. 12 shows a block diagram of access terminal 110 and access network 120. On the reverse link (or uplink), at access terminal 110, a data processor 1210 processes (e.g., formats, encodes, and modulates) data and signaling to be sent to access network 120 in accordance with a radio technology (e.g., HRPD) and generates output chips. A transmitter (TMTR) 1212 then conditions (e.g., converts to analog, filters, amplifies, and frequency upconverts) the output chips and generates a reverse link signal, which is transmitted via an antenna 1214. At access network 120, the reverse link signals from access terminal 110 and other access terminals are received via an antenna 1230 and conditioned (e.g., filtered, amplified, frequency downconverted, and digitized) by a receiver (RCVR) 1232 to obtain samples. A data processor 1234 then processes (e.g., demodulates and decodes) the samples to obtain the data and signaling sent by access terminal 110 and other access terminals.

On the forward link (or downlink), at access network 120, data and signaling to be sent to access terminals are processed by data processor 1234 and further conditioned by a transmitter 1232 to generate a forward link signal, which is transmitted via antenna 1232. At access terminal 110, the forward link signal from access network 120 is received via antenna 1214, conditioned by a receiver 1212, and processed by data processor 1210 to obtain data and signaling sent by access network 120 to access terminal 110.

Controllers/processors 1220 and 1240 control the operation at access terminal 110 and access network 120, respectively. Processor 1210 and/or 1220 may implement process 1000 in FIG. 10 and/or other processes to support communication for access terminal 110. Processor 1210 and/or 1220 may also perform the processing for access terminal 110 in call flow 400 in FIG. 4 through call flow 900 in FIG. 9. Processor 1234 and/or 1240 may implement process 1100 in FIG. 11 and/or other processes to support communication for access terminals. Processor 1234 and/or 1240 may also perform the processing for access network 120 in call flow 400 in FIG. 4 through call flow 900 in FIG. 9. Memories 1222 and 1242 store program codes and data for access terminal 110 and access network 120, respectively. Memory 1222 may store QoS information (e.g., QoS profiles, preconfigured QoS, etc.) for access terminal 110. Memory 1242 may store the preconfigured QoS for the access terminals being served by access network 120. Access network 120 may communicate with other network entities via a communication (Comm) unit 1244.

FIG. 12 shows a simplified block diagram of access terminal 110 and access network 120. In general, access terminal 110 and access network 120 may each include any number of processors, memories, etc. The processing by access network 120 may also be distributed across different network entities, e.g., base stations, BSCs/PCFs, etc.

The techniques described herein may be implemented by various means. For example, these techniques may be implemented in hardware, firmware, software, or a combination thereof. For a hardware implementation, the processing units used to perform the techniques at an access terminal may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof. The processing units at an access network may also be implemented within one or more ASICs, DSPs, processors, etc.

For a firmware and/or software implementation, the techniques may be implemented with modules (e.g., procedures, functions, and so on) that perform the functions described herein. The firmware and/or software codes may be stored in a memory (e.g., memory 1222 or 1242 in FIG. 12) and executed by a processor (e.g., processor 1220 or 1240). The memory may be implemented within the processor or external to the processor.

An apparatus implementing the techniques described herein may be a stand-alone unit or may be part of a device. The device may be (i) a stand-alone integrated circuit (IC), (ii) a set of one or more ICs that may include memory ICs for storing data and/or instructions, (iii) an ASIC such as a mobile station modem (MSM), (iv) a module that may be embedded within other devices, (v) a cellular phone, wireless device, handset, or mobile unit, (vi) etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A method implemented by an access terminal, the method comprising:

establishing a Internet protocol (IP) flow with a network, wherein the establishing includes assigning a reservation label to the first IP flow;

reconfiguring, by negotiation with the network prior to establishing a voice call session, a network resource first instance that achieves a quality of service (QoS) meeting a QoS profile for the IP flow, and is available for subsequent reservation by sending the network a request to turn ON the reservation label;

sending an invite message to the terminal, to initiate the voice call session;

prior to receiving a response from the terminal to the invite message, sending to the network the request to turn ON the reservation label, and receiving from the network a reservation accept indicating network acceptance of the request to turn ON the reservation label;

receiving, via the network, the terminal's response to the invite message, wherein the terminal's response identifies a media format supported by the terminal;

determining whether the media format identified by the terminal's response is compatible with the QoS profile, and if the media format identified by the terminal's response is determined compatible with the QoS profile, leaving the QoS profile unchanged, if the media format identified by the terminal's response is determined not compatible with the QoS profile, then negotiating, with the network, changes in parameters of the QoS profile for compatibility with the media format identified by the terminal's response, and modifying the network resource instance corresponding to the ON reservation label, if required to meet the changes in parameters of the QoS profile; and establishing the voice call session initiated by the invite message, in association with the ON reservation label.

2. The method of claim 1, wherein the reservation label is a first reservation label, the network resource is a first network resource, the QoS is a first QoS, the QoS profile is a first QoS profile, and the IP flow is a first IP flow, and wherein the method further comprises:

determining, during the voice call session, that a change of the voice call session to a second QoS profile is required, the second QoS profile having a second QoS profile identifier, and, in response, attempting to establish a second IP flow with the network, on a corresponding second reservation label, on a network resource second instance that provides a QoS corresponding to the second QoS profile, if said attempting is successful, sending to the network a request to turn OFF the first reservation label and the first IP flow, turning ON the second reservation label, and continuing the voice call session on the second reservation label according to the second QoS profile, and if said attempting is not successful, continuing the voice call session using the ON first reservation label.

3. The method of claim 2, further comprising retaining the second reservation label and corresponding second QoS profile identifier at the end of the voice call session, if the attempt to establish the second IP flow is successful, for selective activation of the second reservation label for use in a subsequent voice call session.

4. An apparatus comprising:

a memory; and at least one processor coupled to the memory and programmed with instructions to:

establish an Internet protocol (IP) flow with a network, and assign a reservation label to the IP flow;

preconfigure by negotiation with the network, prior to establishing a voice call session, a network resource instance that achieves a given quality of service (QoS) meeting a given QoS profile for the IP flow, and is available for subsequent reservation by sending the network a request to turn ON the reservation label, send an invite message to a terminal, to initiate the voice call session;

prior to receiving a response from the terminal to the invite message, send to the network the request to turn ON the reservation label, and receive from the network a reservation accept indicating network acceptance of the request to turn ON the reservation label;

receive, via the network, the terminal's response to the invite message, wherein the terminal's response identifies a media format as being supported by the terminal;

determine whether the media format identified by the terminal's response is compatible with the QoS profile, and if the media format identified by the terminal's response is determined compatible with the QoS profile, leave the QoS profile unchanged, if the media format identified by the terminal's response is determined not compatible with the QoS profile, then negotiate, with the network, changes in parameters of the QoS profile for compatibility with the media format identified by the terminal's response, and modify the network resource instance corresponding to the ON reservation label, if required to meet the changes in parameters of the QoS profile; and establish the voice call session initiated by the invite message in association with the ON reservation label, wherein the memory coupled to the at least one processor is operative to store the QoS profile.

5. The apparatus of claim 4, wherein the reservation label is a first reservation label, the network resource is a first network resource, the QoS is a first QoS, the QoS profile is a first QoS profile, and the IP flow is a first IP flow, and wherein the at least one processor is further programmed with instructions to determine, during the voice call session, that a change of the voice call session to a second QoS profile is required, the second QoS profile having a second QoS profile identifier, and, in response, to attempt to establish a second IP flow with the network, on a corresponding second reservation label, on a network resource second instance that provides a QoS corresponding to the second QoS profile, if said attempt is successful, to send to the network a request to turn OFF the first reservation label and the first IP flow, and to turn ON the second reservation label to continue the voice call session on the second reservation label according to the second QoS profile, and if said attempt is not successful, to continue the voice call session using the ON first reservation label.

6. The apparatus of claim 5, wherein the at least one processor is further programmed with instructions to retain the second reservation label and corresponding second QoS profile identifier at the end of the voice call session, if the attempt to establish the second IP flow is successful, for selective activation of the second reservation label for use in a subsequent for voice call session.

7. An apparatus comprising:

means for establishing a Internet protocol (IP) flow with a network, wherein the means for establishing is configured to assign a reservation label to the IP flow;

means for preconfiguring, by negotiation with the network prior to establishing a voice call session, a network resource instance that achieves a quality of service (QoS) meeting a QoS profile for the IP flow, and is available for subsequent reservation by sending the network a request to turn ON the reservation label;

means for sending an invite message to the terminal, to initiate the voice call session;

means for sending to the network, prior to receiving the terminal's response to the invite message, the request to turn ON the reservation label, and for receiving, prior to receiving the terminal's response to the invite message, the network's reservation accept indicating network acceptance of the request to turn ON the reservation label;

means for receiving, via the network, the terminal's response to the invite message, wherein the terminal's response identifies a media format supported by the terminal, means for determining whether the media format identified by the response is compatible with the QoS profile, and if the media format identified by the terminal's response is determined compatible with the QoS profile, leave the QoS profile unchanged, and if the media format identified by the terminal's response is determined not compatible with the QoS profile, then for negotiating, with the network, changes in parameters of the QoS profile for compatibility with the media format identified by the terminal's response, and for modifying the network resource instance corresponding to the ON reservation label, if required to meet the changes in parameters of the QoS profile; and establishing the voice call session initiated by the invite message, in association with the ON reservation label.

8. The apparatus of claim 7, wherein the reservation label is a first reservation label, the network resource is a first network resource, the QoS is a first QoS, the QoS profile is a first QoS profile, and the IP flow is a first IP flow, and wherein the apparatus further comprises means for determining, during the voice call session, that a change of the voice call session to a second QoS profile is required, the second QoS profile having a second QoS profile identifier, and, in response, for attempting to establish a second IP flow with the network, on a corresponding second reservation label, on a network resource second instance that provides a QoS corresponding to the second QoS profile, means for sending to the network a request to turn OFF the first reservation label and the first IP flow, and for turning ON the second reservation label to continue the voice call session on the second reservation label according to the second QoS profile, if said attempt is successful, and means for continuing the voice call session using the ON first reservation label if said attempt is not successful.

9. The apparatus of claim 8, further comprising means for retaining the second reservation label and corresponding second QoS profile identifier at the end of the voice call session, if the attempt to establish the second IP flow is successful, for selective activation of the second reservation label for use in a subsequent voice call session.

10. A non-transitory computer-readable medium including instructions stored thereon executable by one or more processors to:

establish an Internet protocol (IP) flow with a network, and assign a reservation label to the IP flow;

preconfigure by negotiation with the network, prior to establishing a voice call session, a network resource instance that achieves a given quality of service (QoS)

meeting a given QoS profile for the IP flow, and is available for subsequent reservation by sending the network a request to turn ON the reservation label;

send an invite message to a terminal, to initiate the voice call session;

prior to receiving the terminal's response to the invite message, send to the network the request to turn ON the reservation label, and receive, from the network, the network's reservation accept indicating network acceptance of the request to turn ON the reservation label;

receive from the terminal a response to the invite message, wherein the terminal's response identifies a media format as being supported by the terminal, determine whether the media format identified by the terminal's response is compatible with the QoS profile, if the media format identified by the terminal's response is determined compatible with the QoS profile, leave the QoS profile unchanged, if the media format identified by the terminal's response is determined not compatible with the QoS profile, then negotiate, with the network, changes in parameters of the QoS profile for compatibility with the media format identified by the terminal's response, and modify the network resource instance corresponding to the ON reservation label if required to meet the changes in parameters of the QoS profile, and establish the voice call session initiated by the invite message in association with the ON reservation label.

11. The non-transitory computer-readable medium of claim 10, wherein the reservation label is a first reservation label, the network resource is a first network resource, the QoS is a first QoS, the QoS profile is a first QoS profile, and the IP flow is a first IP flow, and wherein the non-transitory computer-readable medium further includes instructions stored thereon, executable by one or more processors, to determine, during the voice call session, that a change of the voice call session to a second QoS profile is required, the second QoS profile having a second QoS profile identifier, and, in response, to attempt to establish a second IP flow with the network, on a corresponding second reservation label, on a network resource second instance that provides a QoS corresponding to the second QoS profile, if said attempt is successful, to send to the network a request to turn OFF the first reservation label and the first IP flow, and to turn ON the second reservation label to continue the voice call session on the second reservation label according to the second QoS profile, and if said attempt is not successful, to continue the voice call session using the ON first reservation label.

12. The non-transitory computer-readable medium of claim 11, further including instructions stored thereon, executable by one or more processors, to retain the second reservation label and corresponding second QoS profile identifier at the end of the voice call session, if the attempt to establish the second IP flow is successful, for selective activation of the second reservation label for use in a subsequent voice call session.

* * * * *